US007526950B2

(12) United States Patent
Van Nieuwstadt et al.

(10) Patent No.: US 7,526,950 B2
(45) Date of Patent: May 5, 2009

(54) EMISSION CONTROL DIAGNOSTIC SYSTEM AND METHOD

(75) Inventors: Michiel J. Van Nieuwstadt, Ann Arbor, MI (US); Emil G. Serban, Windsor (CA)

(73) Assignee: Ford Global Technologies, LLC, Dearborn, MI (US)

( * ) Notice: Subject to any disclaimer, the term of this patent is extended or adjusted under 35 U.S.C. 154(b) by 105 days.

(21) Appl. No.: 11/788,418

(22) Filed: Apr. 19, 2007

(65) Prior Publication Data
US 2008/0178656 A1 Jul. 31, 2008

Related U.S. Application Data (60) Provisional application No. 60/887,532, filed on Jan. 31, 2007.

(51) Int. Cl.
G01M 15/10 (2006.01)
(52) U.S. Cl. .................................. 73/114.75
(58) Field of Classification Search ............... 73/23.31, 73/114.69, 114.71, 114.74, 114.75
See application file for complete search history.

(56) References Cited

U.S. PATENT DOCUMENTS

| 6,192,677 | B1 | 2/2001 | Tost |
| 6,363,771 | B1* | 4/2002 | Liang et al. ................. 73/23.31 |
| 6,947,831 | B2* | 9/2005 | van Nieuwstadt ........... 701/114 |
| 6,993,900 | B2 | 2/2006 | Upadhyay et al. |
| 7,278,304 | B2* | 10/2007 | Zanini-Fisher et al. ... 73/114.71 |
| 2004/0040289 | A1 | 3/2004 | Mazur et al. |
| 2007/0125349 | A1* | 6/2007 | Zanini-Fisher et al. ...... 123/679 |
| 2008/0022659 | A1* | 1/2008 | Viola et al. ................... 60/286 |
| 2008/0098725 | A1* | 5/2008 | Driscoll et al. ................ 60/285 |

FOREIGN PATENT DOCUMENTS

| EP | 1176295 | 9/2004 |
| WO | WO 2004/109072 | 12/2004 |

* cited by examiner

Primary Examiner—Eric S McCall
(74) Attorney, Agent, or Firm—Julia Voutyraas; Alleman Hall McCoy Russell & Tuttle LLP (57) ABSTRACT

A method of diagnosing an emission control system of an internal combustion engine, comprising during degraded performance of the emission control system, dynamically identifying a relationship between a plurality of operating conditions of the emission control system; and correlating the relationship to a plurality of potential sources of degraded performance of the emission control system to identify at least one degraded source among the plurality of potential sources.

17 Claims, 5 Drawing Sheets

EMISSION CONTROL DIAGNOSTIC SYSTEM AND METHOD

The present application claims priority to provisional application titled "EMISSION CONTROL DIAGNOSTIC SYSTEM AND METHOD" having Ser. No. 60/887,532, filed Jan. 31, 2007, naming Emil Serban and Michiel van Nieuwstadt as inventors.

TECHNICAL FIELD

The present application relates to the field of automotive emission control systems and methods.

BACKGROUND AND SUMMARY

Selective catalytic reduction (SCR) systems have been used to reduce automotive emissions. However, degraded performance in SCR systems may be related to a plurality of sources. For example, the injection system, the SCR catalyst, and the reductant quality as well as various other potential sources may be root cause for degraded performance.

One way to identify a potential source of degraded performance may be to determine degraded performance of the emission control system whereby an inspection of the system may be performed for diagnosis. However, under some conditions, such as during travel in remote areas, a mechanical diagnose of the system may be inconvenient. Further, it may be desirable to isolate a source of potential degraded performance within the emission control system so as to operate the vehicle such that various other strategies may still be used to control emissions.

In one approach, a method may be used that identifies which of a plurality of potential degradation sources is at least partially responsible for causing degraded output of a urea-based NOx reduction system by considering and correlating each of the plurality of sources. In another approach, a method of operating an internal combustion engine having an emission control system is provided. The method comprises, during degraded performance of the emission control system, dynamically identifying a relationship between a plurality of operating conditions of the emission control system, and correlating the relationship to one or more sources of degraded performance of the emission control system. Additionally, or alternatively, the method may distinguish one or more sources of degraded performance from a plurality of potential sources of said degraded performance based on said relationship. In this way, accurate identification of a source of degradation among a plurality of potential sources is possible, even when each of the potential sources may be responsible for the degradation.

In still another approach, a method of diagnosing an emission control system may be used that comprises: during degraded performance of the emission control system, dynamically identifying a relationship between a plurality of operating conditions of the emission control system, and correlating the relationship to a plurality of potential sources of degraded performance of the emission control system to identify at least one degraded source among said plurality of potential sources.

DETAILED DESCRIPTION OF THE DEPICTED EMBODIMENTS

Figure 1:
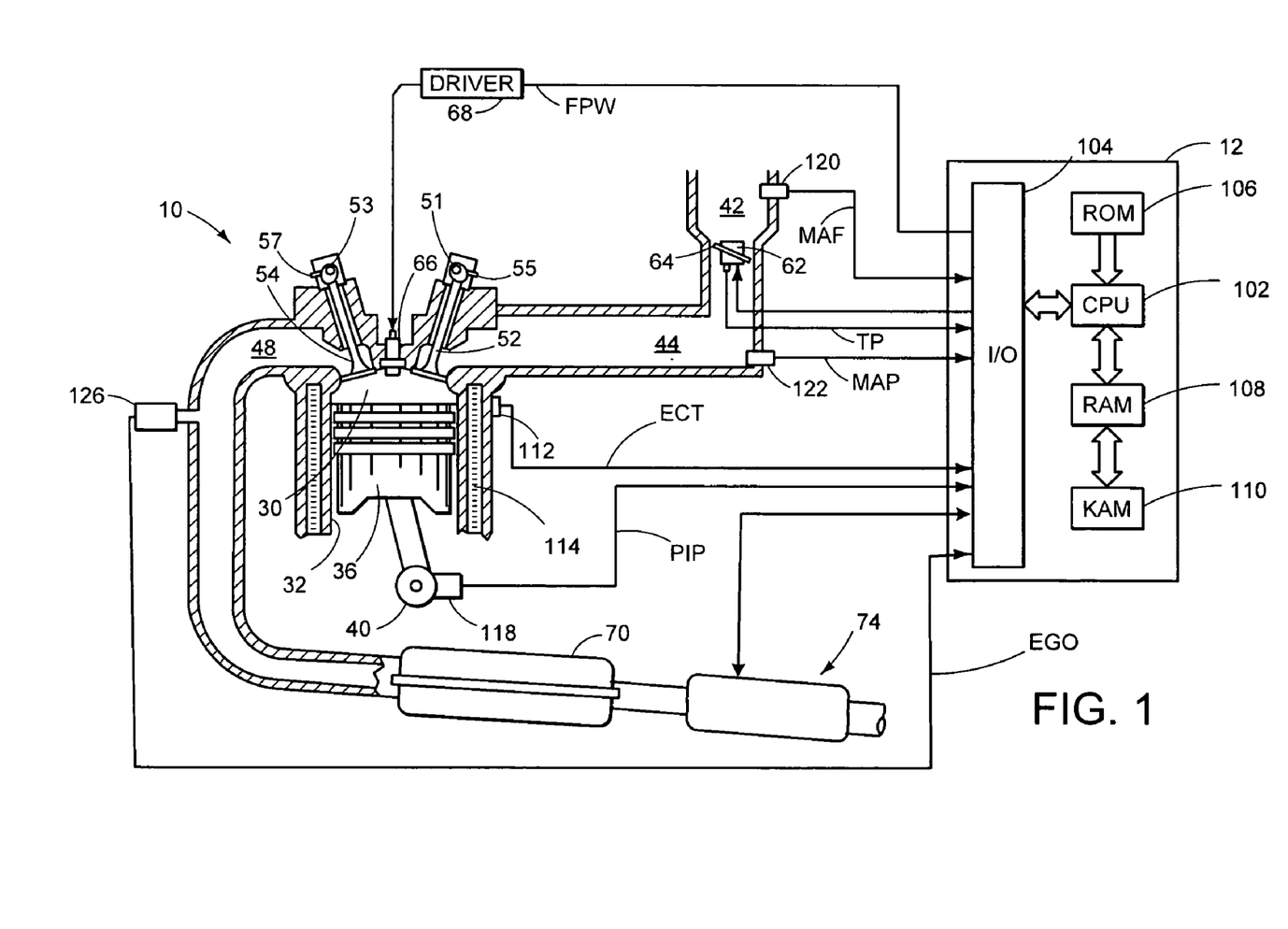
FIG. 1 shows an exemplary embodiment of an internal combustion engine and control system.

Referring now to FIG. 1, direct injection internal combustion engine 10, comprising a plurality of combustion chambers and controlled by electronic engine controller 12, is shown. Combustion chamber 30 of engine 10 includes combustion chamber walls 32 with piston 36 positioned therein and connected to crankshaft 40. In one example, piston 36 includes a recess or bowl (not shown) to form selected levels of stratification or homogenization of charges of air and fuel. Alternatively, a flat piston may also be used.

Combustion chamber 30 is shown communicating with intake manifold 44 and exhaust manifold 48 via intake valve 52, and exhaust valve 54. Fuel injector 66 is shown directly coupled to combustion chamber 30 for delivering liquid fuel directly therein in proportion to the pulse width of signal fpw received from controller 12 via conventional electronic driver 68. Fuel is delivered to fuel system (not shown) including a fuel tank, fuel pumps, and a fuel rail. In some embodiments, engine 10 may include a plurality of combustion chambers each having a plurality of intake and/or exhaust valves.

Intake valve 52 may be controlled by controller 12 via electric valve actuator (EVA) 51. Similarly, exhaust valve 54 may be controlled by controller 12 via EVA 53. During some conditions, controller 12 may vary the signals provided to actuators 51 and 53 to control the opening and closing of the respective intake and exhaust valves. The position of intake valve 52 and exhaust valve 54 may be determined by valve position sensors 55 and 57, respectively. In alternative embodiments, one or more of the intake and exhaust valves may be actuated by one or more cams, and may utilize one or more of cam profile switching (CPS), variable cam timing (VCT), variable valve timing (VVT) and/or variable valve lift (VVL) systems to vary valve operation. For example, combustion chamber 30 may alternatively include an intake valve controlled via electric valve actuation and an exhaust valve controlled via cam actuation including CPS and/or VCT.

Intake manifold 42 may include a throttle 62 having a throttle plate 64. In this particular example, the position of throttle plate 64 may be varied by controller 12 via a signal provided to an electric motor or actuator included with throttle 62, a configuration that is commonly referred to as electronic throttle control (ETC). In this manner, throttle 62 may be operated to vary the intake air provided to combustion chamber 30 among other engine cylinders. The position of throttle plate 64 may be provided to controller 12 by throttle position signal TP. Intake manifold 42 may include a mass air flow sensor 120 and a manifold air pressure sensor 122 for providing respective signals MAF and MAP to controller 12.

Controller 12 activates fuel injector 66 so that a desired air-fuel ratio mixture is formed. Controller 12 controls the amount of fuel delivered by fuel injector 66 so that the air-fuel ratio mixture in chamber 30 can be selected to be substantially at (or near) stoichiometry, a value rich of stoichiometry, or a value lean of stoichiometry. Further, controller 12 is configured to activate fuel injector 66 so that multiple fuel injections may be performed during a cycle.

Exhaust manifold gas sensor 126 is shown coupled to exhaust passage 48 upstream of catalytic converter 70. Sensor 126 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor.

Catalytic converter 70 is shown in communication with exhaust manifold 48. In some embodiments, Catalytic converter 70 may be a diesel oxidation catalyst. An emission control diagnostic system 74 is shown in communication with catalytic converter 70. Controller 12 is configured to control emission control system. This feature is described in more detail below.

Controller 12 is shown in FIG. 1 as a conventional microcomputer including: microprocessor unit 102, input/output ports 104, an electronic storage medium of executing programs and calibration values, shown as read-only memory chip 106 in this particular example, random access memory 108, keep alive memory 110, and a conventional data bus.

Controller 12 is shown receiving various signals from sensors coupled to engine 10, in addition to those signals previously discussed, including: engine coolant temperature (ECT) from temperature sensor 112 coupled to cooling sleeve 114; a profile ignition pickup signal (PIP) from Hall effect sensor 118 coupled to crankshaft 40 giving an indication of engine speed (RPM); throttle position TP from throttle position sensor 120; and absolute Manifold Pressure Signal MAP from sensor 122. Engine speed signal RPM is generated by controller 12 from signal PIP in a conventional manner and manifold pressure signal MAP provides an indication of engine load.

Figure 2:
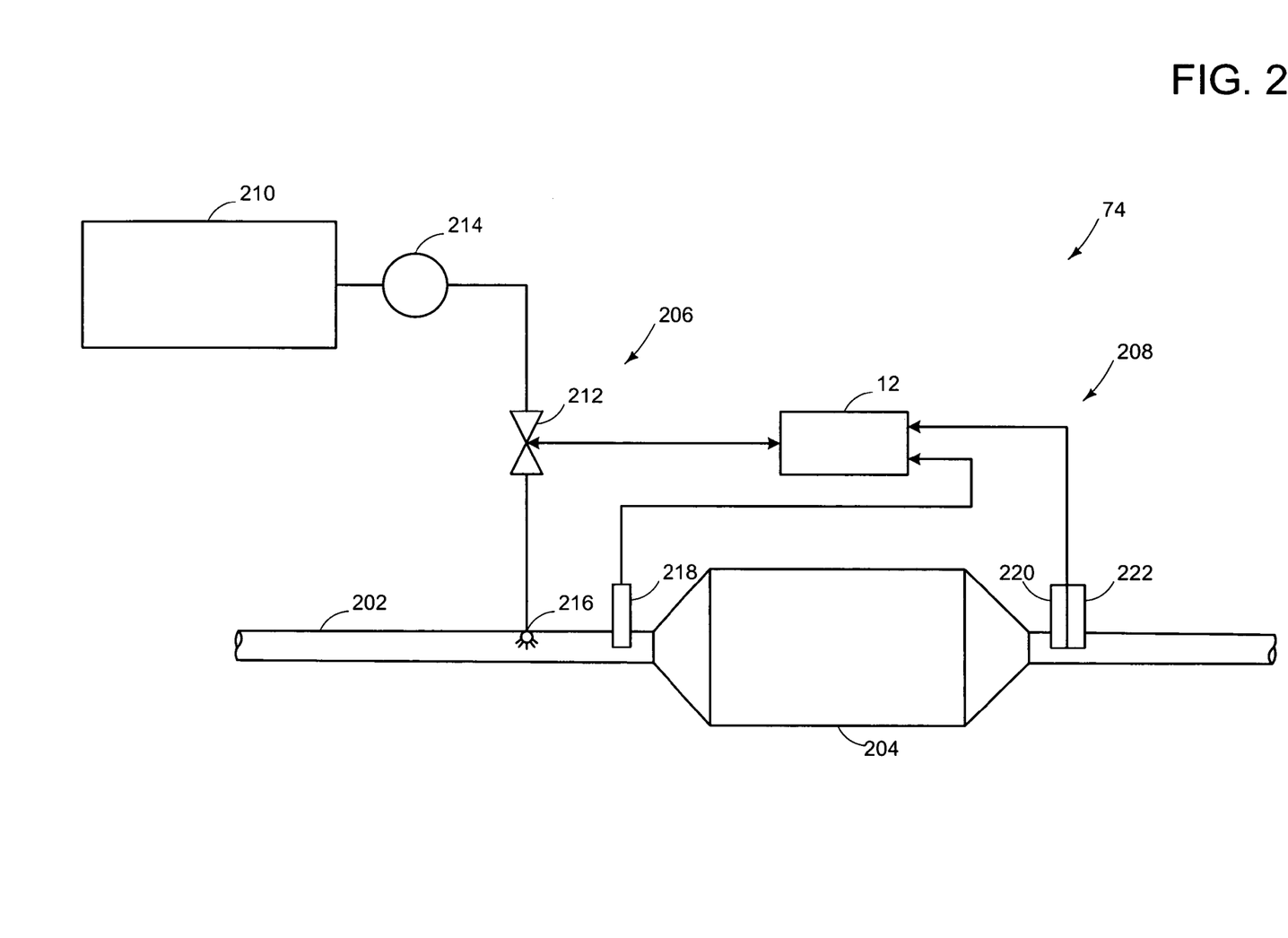
FIG. 2 shows an exemplary embodiment of an emission control diagnostic system.

Combustion in engine 10 can be of various types, depending on operating conditions. While FIG. 1 depicts a compression ignition engine, it will be appreciated that the embodiments described below may be used in any suitable engine, including but not limited to, diesel and gasoline compression ignition engines, spark ignition engines, direct or port injection engines, etc. Further, various fuels and/or fuel mixtures such as gasoline, diesel, H2, ethanol, methane, and/or combinations thereof may be used FIG. 2 shows an illustration of an example of emissions control diagnostic system 74 of engine 10 in more detail. Generally, the components described herein may operate to monitor performance of the system and to further identify potential sources of degraded performance as needed. The emissions control diagnostic system is shown coupled to an exhaust system 202 at a location upstream of a catalytic converter 70 (shown in FIG. 1), such as a diesel oxidation catalyst. Further, the emission control diagnostic system may generally include a SCR catalyst 204, an injection system 206, and a diagnostic system 208. In addition, the emission control diagnostic system may include a diesel particulate filter (not shown).

SCR catalyst 204 may facilitate the reduction of NOx in the exhaust from engine 10 by a reagent. In some embodiments, the reductant may be liquid urea. In particular, NOx from the exhaust system reacting with urea in the SCR catalyst may form more environmentally benign products such as nitrogen, carbon dioxide, and water for emission into the atmosphere. Some exemplary SCR reactions are as follows.

First, urea added to exhaust system 202 may decompose into ammonia as follows:

Ammonia may, in turn, react with NOx in the SCR catalyst according to various different reaction pathways, including but not limited to one or more of the following:

It may be desirable to introduce an amount of urea to the exhaust system generally derived from the above NOx reduction reaction stoichiometries or a look-up table stored in controller 12. In particular, the amount of urea introduced to exhaust system 202 may be based on information from one or more sensors. For example, the output signal from a sensor, such as exhaust gas manifold sensor 126 shown in FIG. 1, may indicate an amount of NOx in the exhaust. As such, controller 12 may prompt injection system 206 to introduce an amount of urea to the exhaust system accordingly where the amount of urea injected may be expected to substantially consume the urea and convert a substantial portion of the NOx. Further, a minimum conversion efficiency may be selected to define acceptable performance of the emission control system such that NOx may be substantially removed from the exhaust. For example, a predetermined minimum conversion efficiency may be used as a threshold where conversion of NOx below the predetermined conversion efficiency may indicate degraded performance of the emission control system.

Injection system 206 may store and/or supply a reductant to the SCR catalyst. In some embodiments, the injection system may include a reductant storage device 210 containing liquid urea. Further, the injection system may include ancillary components to supply the urea to exhaust system, such as supply pump 214, reductant valve 212, and nozzle 216, for example. Under some conditions, the reductant valve may be configured to facilitate an amount of urea from the reductant storage device to be transported by the supply pump through the nozzle into the exhaust system coupled to the SCR catalyst. For example, controller 12 may prompt an amount of urea to be injected corresponding to the amount of NOx leaving engine 10 as detected by sensor 126 (not shown in FIG. 2) so as to substantially consume the urea and reduce the NOx in the exhaust. However, under other conditions, the amount of urea injected may be adjusted to be different from the amount determined to substantially consume urea and reduce NOx. In particular, the amount of urea may be adjusted to diagnose performance of the emission control system as described in more detail below.

A diagnostic system 208 may monitor the performance of the emission control system and identify one or more potential sources of degraded performance. In particular, controller 12 may monitor performance of the emission control system such that degraded performance may be indicated where performance may be determined based on various operating conditions. As such, the diagnostic system may include one or more sensors arranged in communication with controller 12 to detect various operating conditions of the emission control diagnostic system. In some embodiments, the diagnostic system may include a temperature sensor 218, a NOx sensor 220, and an ammonia sensor 222, although various other sensors, devices, or combinations thereof may also provide feedback to the controller. For example, temperature sensor 218 may be fluidically disposed upstream the nozzle whereat urea may be introduced to the exhaust system. Further, NOx sensor 220 and ammonia sensor 222 may be disposed upstream the SCR catalyst to determine various concentrations in the exhaust of the SCR catalyst. The exemplary sensors described herein may function to determine degraded performance of the emission control system and/or identify potential sources of degraded performance as described in detail below.

Under some conditions, the diagnostic system may indicate acceptable performance in the SCR catalyst. In some embodiments, the ammonia sensor and/or the NOx sensor may be used to determine acceptable performance. For example, ammonia from the decomposition of urea introduced to the exhaust system may substantially reduce the NOx entering the SCR catalyst. Alternately or in addition, urea introduced to the exhaust system may decompose to ammonia whereby ammonia absorbed in the SCR catalyst may be substantially consumed by the NOx entering the SCR catalyst. As such, the NOx sensor and/or the ammonia sensor may indicate substantially low levels of NOx and/or ammonia leaving the SCR catalyst. In this way, the controller may monitor performance of the emission control system based on various operating conditions as sensed by various components as described herein.

However, under some other conditions, the diagnostic system may indicate degraded performance of the SCR catalyst. In some embodiments, a conversion efficiency of the emission control system may be less than a predetermined minimum conversion efficiency. Alternately or in addition, a NOx and/or ammonia concentration may be greater than a predetermined allowable emission level. For example, the amount of ammonia absorbed in the SCR catalyst may not substantially reduce the NOx entering the SCR whereby the NOx sensor may indicate a concentration of NOx greater than a predetermined allowable NOx level leaving the SCR catalyst. In another example, ammonia may not be substantially consumed by NOx in the exhaust stream such that a substantial concentration of ammonia may be detected in the exhaust of the SCR catalyst. In this way, the diagnostic system may indicate degraded performance in the SCR catalyst.

The diagnostic system may be prompted to identify potential sources of the degraded performance described above. In some embodiments, potential sources of degraded performance may include the injector system, the SCR catalyst, a reductant quality, various other sources, or some combination thereof. In particular, various operating conditions, such as temperature, NOx concentration, ammonia concentration, etc. may communicate information associated with potential sources of degraded performance. Further, various operating conditions may be detected concurrently such that a source of degraded performance may be identified. For one example, a substantial NOx concentration leaving the SCR catalyst concurrent with a substantial ammonia concentration at the SCR outlet may indicate the SCR catalyst as a source of degraded performance of the emission control system. As such, the diagnostic system may detect a relationship between operating conditions correlated to a potential problem in the emission control system. In this way, various operating conditions may be concurrently monitored and isolated to identify root cause of degraded performance, with each of the potential sources evaluated. As described in detail below, one approach may monitor various operating conditions of the emission control system and sequentially determine a relationship between the operating conditions to identify one or more sources of degraded performance therein based on concurrently detected operating conditions.

Figure 3:
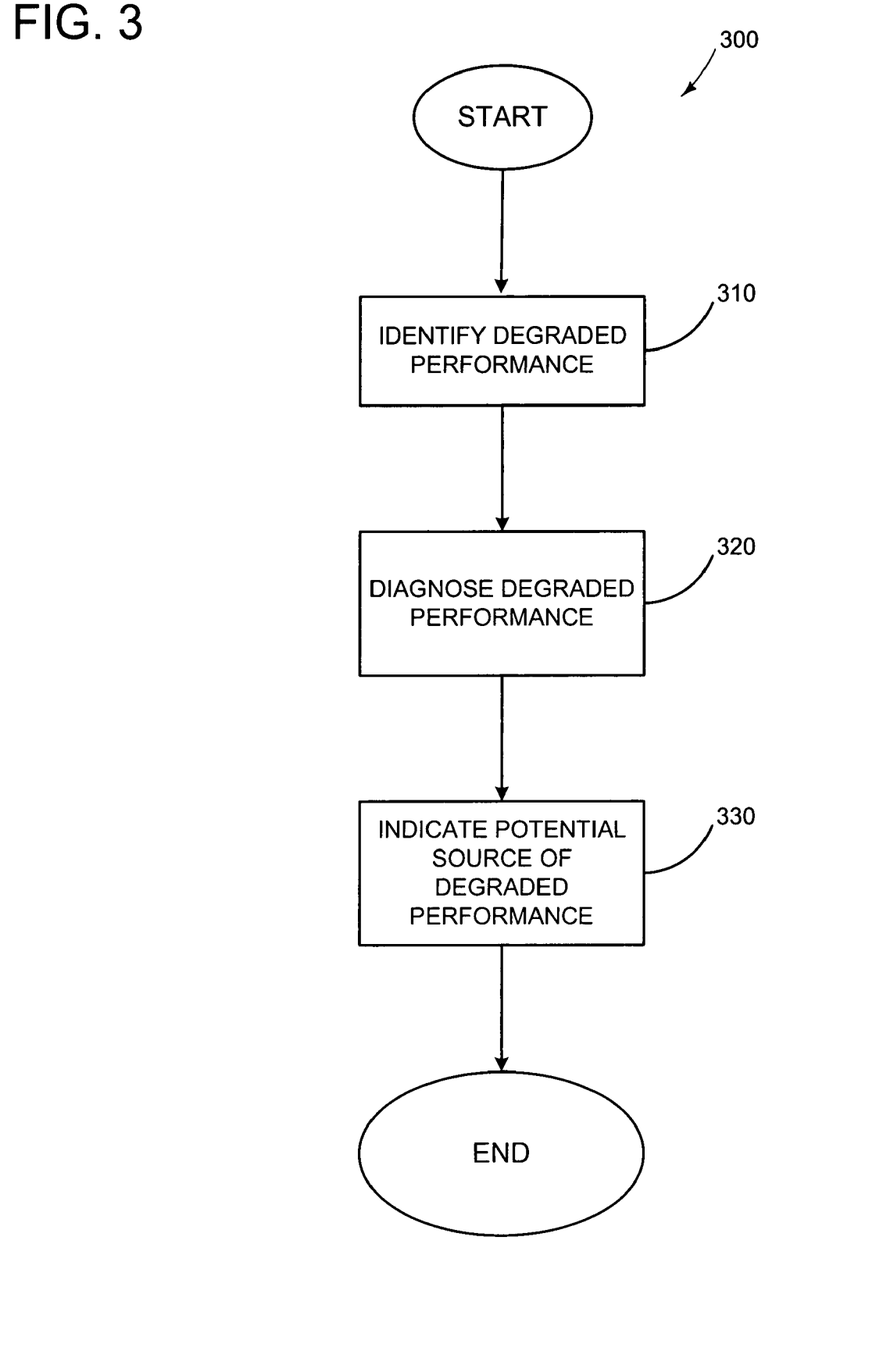
FIG. 3 is a flowchart of an exemplary embodiment of a method for diagnosing an emission control diagnostic system.

FIG. 3 shows a flowchart 300 of an exemplary method for diagnosing degraded performance in an emission control device. In particular, the method described herein may identify potential sources of degraded performance. Specifically, a relationship between various operating conditions may be sequentially correlated to one or more potential sources of degraded performance of an emission control system as further detailed in FIG. 4 and FIG. 5.

Beginning at step 310, the diagnostic system detects degraded performance. In particular, the controller may determine degraded performance of the emission control system. As described above, a conversion efficiency, NOx concentration, ammonia concentration, various other conditions, or some combination thereof may be used to determine performance. Under some conditions, the controller may identify degraded performance of the emission control system. As such, an output signal may be sent to the controller indicating degraded performance of the emission control system.

As such, in step 320, the controller may be prompted to diagnose degraded performance of the emission control system. In particular, degraded performance of the emission control system may prompt the controller to identify one or more potential sources of degraded performance. Specifically, a relationship between various operating conditions in the emission control system may be correlated to one or more potential sources of degraded performance so as to identify a root cause.

Figure 4A:
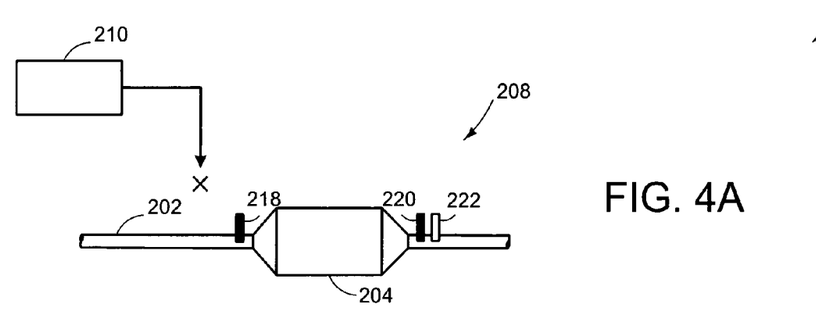
FIG. 4 shows an exemplary embodiment of a plurality of root cause conditions of the emission control diagnostic system.
Figure 4B:
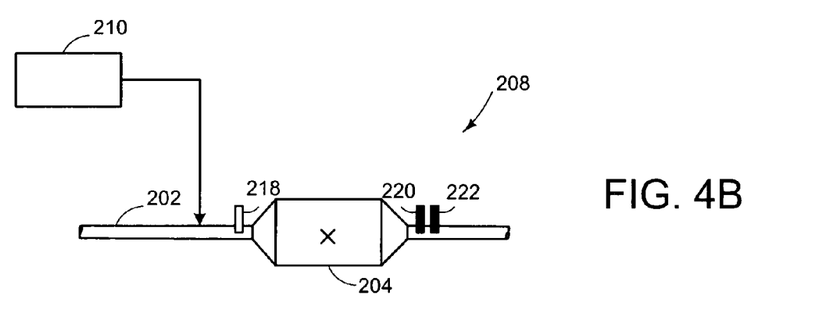
Figure 4C:
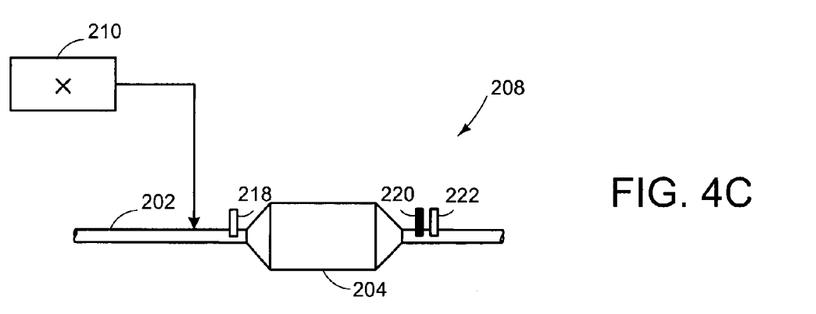

Various conditions in the emission control system may result in degraded performance, as illustrated in detail with respect to FIG. 4. In some embodiments, a source of degraded performance may be the injector system, as detailed below in FIG. 4A. For example, an injector may be clogged such that a reduced amount of urea may be introduced to the exhaust system. In another example, a failure in communication between the controller and the injector system may inhibit or reduce urea injection. In another embodiment, a source of degraded performance may be a damaged or deteriorated SCR catalyst as detailed below in FIG. 4B. In yet another embodiment, a source of degraded performance may be a low reductant quality of the fluid stored in the reductant storage device as detailed in FIG. 4C. For example, a reductant-diluting substance, such as water, may be introduced to the reductant storage device instead of a reductant, such as urea. Further, potential sources of degraded performance, may be associated with various operating conditions wherein the operating conditions may be related to identify root cause.

In some embodiments, the injection system may be prompted to adjust an amount of urea into the exhaust system so as to monitor a response of the emission control system. Consequently, the controller may communicate with one or more sensors to detect various operating conditions in response to an injection adjustment whereby feedback from various sensors may be used to identify one or more potential sources of degraded performance. Further, the controller may sequentially receive feedback from a plurality of sensors whereby a relationship may be determined between various operating conditions based on concurrently detected operating conditions. In this way, the controller may sequentially determine a relationship based on the feedback correlating to one or more sources of degraded performance to identify one or more sources of degraded performance.

In one embodiment, an operating condition may be detected by a sensor such that it may be determined if a potential source may be identified as a source of degraded performance. For example, temperature sensor 218 may detect a temperature conditions such that the injection system may or may not be identified as a source of degraded performance. Based on feedback from the sensor, the controller may then receive feedback from another sensor such that it may be determined whether another source of degraded performance may be identified as a source of degraded performance. For example, an ammonia sensor 222 may detect an ammonia concentration at the outlet of the SCR catalyst such that the SCR catalyst may or may not be a potential source of degraded performance. Further, based on feedback detected from a plurality of sensors, such as the temperature and/or the ammonia sensor, the controller may sequentially distinguish the injection system and/or the SCR catalyst as sources of degraded performance from various other potential sources of degraded performance whereby various other potential sources, such as reductant quality, for example, or combinations thereof may or may not further be identified as potential sources of degraded performance. In this way, the emission control diagnostic system may methodically determine root cause of degraded performance as detailed further below in FIG. 5.

In one embodiment, temperature sensor 218 may be used to determine if the injector system may be a potential source of degraded performance. Under some conditions, a temperature of the exhaust system intermediate to the injection nozzle and the SCR catalyst may at least temporarily drop in response to a urea injection. For example, urea delivered to the exhaust system may result in a temperature drop. However, under other conditions, the temperature sensor may not detect a temperature drop following an adjustment in urea injection. For example, a temperature drop may not be detected when a damaged injector may not deliver a urea injection as prompted. As such, the temperature sensor may be used to monitor a response to a urea injection. In this way, the injection system may be identified as root cause of degraded performance of the emission control system if a reduction in temperature in the exhaust system downstream the nozzle may not be sensed after a change in injection amount.

In another embodiment, if the injection system may not be identified as a source of degraded performance, ammonia sensor 222 may be used to determine if the SCR catalyst may be a potential source. For example, the injection system may be prompted to adjust an injection amount to the exhaust system whereby the temperature sensor may detect a reduced temperature upstream the SCR catalyst (i.e. the injection system may functional). However, ammonia sensor 222 may detect high levels of ammonia in the exhaust of the SCR catalyst. For example, the SCR catalyst may be damaged such that ammonia may not be absorbed but instead substantially pass through into the exhaust of the SCR catalyst. Further, ammonia concentrations leaving the SCR catalyst may be at least partially correlated to an adjustment of a reductant amount. In this way, the SCR catalyst may be diagnosed to be a root cause of degraded performance if unacceptable ammonia levels may correlate to adjustments in reductant flow.

In another embodiment, if the injector system and/or the SCR catalyst may not be identified as a source of degraded performance, various other sources may be identified as root cause. For example, under some conditions, a reductant-diluting substance may be introduced to the reductant storage device. As such, the controller may prompt the injection system to deliver the reductant-diluting substance to the exhaust system whereby a temperature sensor may detect a reduced temperature although urea may not be injected to the exhaust. Further, the ammonia sensor may not detect substantial levels of ammonia leaving the SCR catalyst. Consequently, a non-ammonia containing substance may be introduced to the exhaust system so as to facilitate a reduction in temperature at the temperature sensor as well as maintain low levels of ammonia leaving the SCR catalyst. In this way, reductant quality in the reductant storage device may be diagnosed as root cause of degraded performance. As described in the above embodiments, method 300 may diagnose one or more potential sources of degraded performance by sequentially determining a relationship between the operating conditions as further detailed in FIG. 5.

At step 330, one or more potential sources of degraded performance may be indicated. In some embodiments, the controller may prompt an indicator light to illuminate corresponding to the location of the root cause determined by the diagnostic system. In various other embodiments, the controller may enable various other emission control strategies until a root cause of degraded performance may be fixed. In this way, the emission control diagnostic system may determine an appropriate strategy to compensate for degraded performance of the emission control system until root cause may be fixed.

FIG. 4 is a schematic illustration of embodiments of potential sources of degraded performance in the emission control system. In particular, the embodiments described below schematically illustrate feedback from various sensors in response to a change in the amount of urea introduced to the exhaust system where the feedback may be correlated to one or more potential sources of degraded performance as described above. Specifically, the embodiments shown in FIG. 4 may illustrate a plurality of relationships between various operating conditions where the relationships may be correlated to one or more potential sources of degradation of the emission control system. As such, one or more sensors may be filled solid where a solid indicator may be used to symbolically represent an undesirable operating condition, such as a concentration of NOx, a concentration of ammonia, or a temperature condition, for example. Further, although in the embodiments described herein, NOx sensor 220 may indicate degraded performance, various conditions alternate to NOx concentration may be used to indicate degraded performance of the emission control system.

Referring specifically to the embodiment of FIG. 4A, feedback from temperature sensor 218 may identify the injection system as a potential source of degraded performance. In particular, a substantial NOx concentration at the SCR outlet may trigger an adjustment in reductant injection whereby the temperature sensor downstream the nozzle may detect an undesirable temperature condition. For example, a temperature may not drop as expect following a reductant injection. As such, a relationship between a substantial NOx concentration at the SCR outlet and a temperature condition wherein the temperature may not drop in response to an adjustment in reductant injection may be correlated to a problem in the injection system. As described above, a clogged injector and/or an electronic failure may deter triggering a urea injection whereby the temperature sensor may not detect a temperature drop following a change in urea injection. As such, if a reduction in temperature may not be detected, the injector system may be identified as root cause of degraded performance of the emission control system.

Referring now to the embodiment of FIG. 4B, feedback from ammonia sensor 222 may identify the SCR catalyst as a potential source of degraded performance. In particular, a substantial NOx concentration at the SCR outlet may trigger an adjustment in reductant injection whereby a concentration of ammonia at the SCR outlet may be detected. As such, a relationship between a substantial NOx concentration and an ammonia concentration at the SCR outlet in response to an adjustment in reductant injection may be correlated to a problem in the SCR. As described above, a damaged or deteriorated SCR catalyst may result in high levels of ammonia in the exhaust of the SCR catalyst. As such, if a substantial concentration of ammonia may be detected in the exhaust of the SCR catalyst, the SCR catalyst may be identified as root cause of degraded performance of the emission control system.

Referring specifically to the embodiment of FIG. 4C, degraded reductant quality may be identified as a potential source of degraded performance if neither the injector system nor the SCR catalyst may be identified as root cause for degraded performance of the emission control system. In particular, a substantial NOx concentration at the SCR outlet may trigger an adjustment in reductant injection whereby the temperature sensor downstream the nozzle may detect a temperature drop and a substantial concentration of ammonia may not be detected at the SCR outlet. As such, a relationship between a substantial NOx concentration at the SCR outlet, an expected temperature drop following a reductant injection, and an acceptable level of ammonia at the outlet of the SCR catalyst may be correlated to various other problems, such as a reduced reductant quality, degraded injection, etc. In this way, the emission diagnostic system may determine root cause of degraded performance by sequentially detecting a plurality of operating conditions and identifying a source of degraded performance based on a relationship between the operating conditions.

Figure 5:
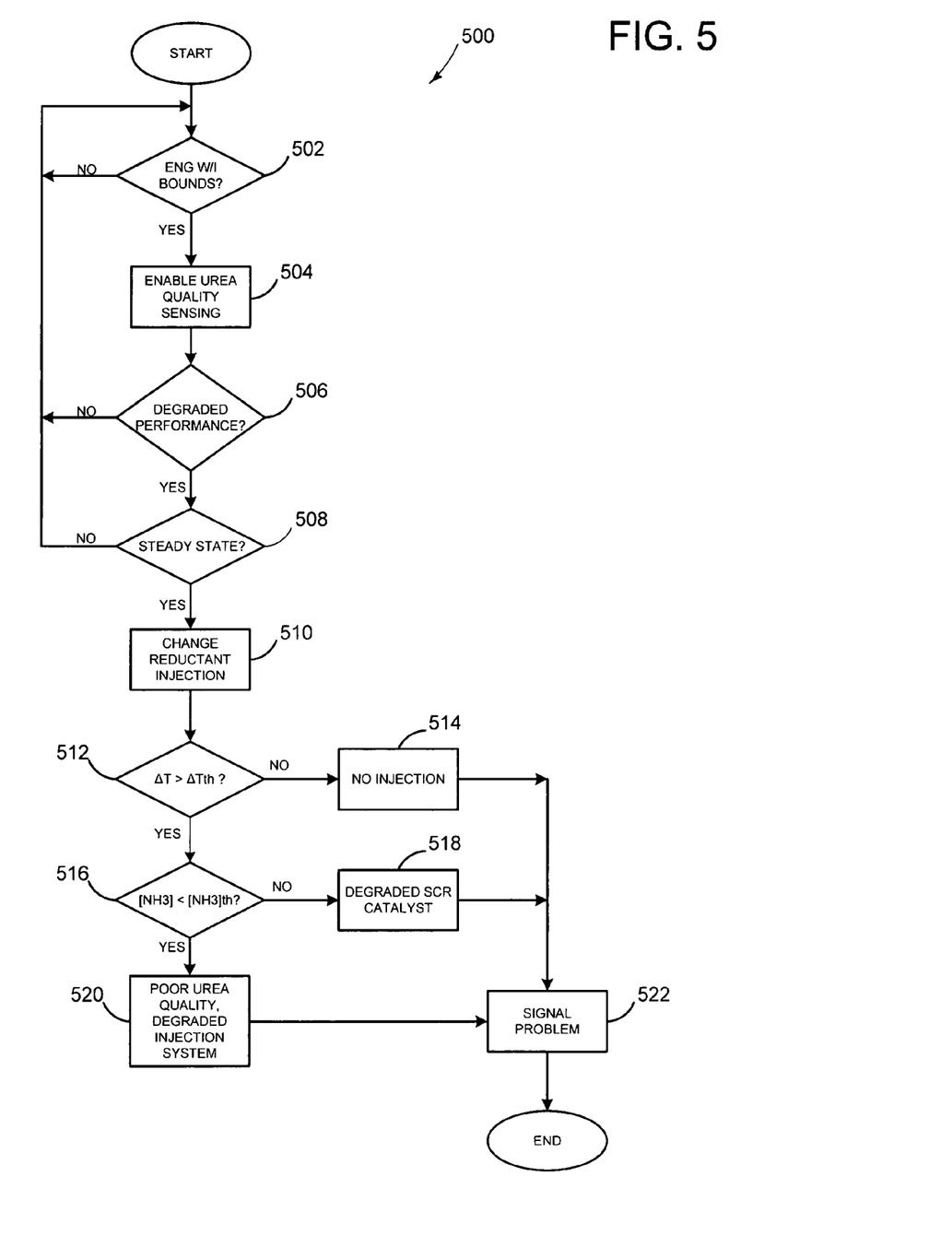
FIG. 5 is a flowchart of another exemplary embodiment of a method for diagnosing an emission diagnostic system.

FIG. 5 shows a flowchart 500 of an exemplary method for identifying a potential source of degraded performance. Generally, the method described in flowchart 500 may enable urea quality sensing, determine degraded performance of the emission control system, then identify root cause of the degraded performance at steady state conditions based on various operating conditions in response to a change in an injection amount from the reductant storage device as described herein.

Method 500 begins at step 502 wherein it may be determined if the engine may be operating within predetermined bounds. In particular, the emission control system may not be diagnosed if various engine operating conditions may not be met. In some embodiments, the engine operating conditions may include an exhaust temperature, an engine speed, a vehicle speed, an EGR level, an exhaust back pressure, a fuel quantity, a torque, a coolant temperature, various other engine operating conditions, or some combination thereof. For example, if the engine exhaust temperature may be below a predetermined temperature threshold, the method as described herein may not continue so as to reduce or prevent diagnosis of degraded performance of the system during conditions when low performance may be expected. Further, method 500 may be disabled during periods of transient operation, such as during a transmission shift, when using a glow plug, during air conditioning, alternating, braking, power steering, etc. In this way, robustness of the method described herein may be improved.

Continuing to step 504, method 500 may enable urea quality sensing if the engine may be operating within the bounds described in step 502. As such, the controller may be prompted to begin a process for determining degrading performance whereby root cause of the degraded performance may be identified based on various operating conditions.

Referring now to step 506, the controller may determine degraded performance of the emission control system. In particular, as described above, a conversion efficiency, NOx concentration, ammonia concentration, various other conditions, or some combination thereof may be used to determine performance. If degraded performance may not be determined (i.e. conversion efficiency may be greater than a predetermined conversion efficiency, substantially low levels of NOx and/or ammonia in the exhaust of the SCR catalyst, etc.), then method 500 may return to step 502. However, if degraded performance of the emission control system may be determined in the emission control system, then method 500 may continue to step 508.

Next, at step 508, it may be determined if the engine may be operating at steady state. In some embodiments, steady-state may be identified based on various engine operating conditions, such as engine speed, pedal position, SCR temperature, etc. If engine operating conditions may not be at steady-state, method 500 may return to step 502. However, if engine operating conditions may be at steady state then method 500 may continue to step 510.

At step 510, a reductant injection may be adjusted. In some embodiments, an amount of reductant injected to the exhaust system may be changed. In various other embodiments, an injection profile may be changed continually. For example, a reductant injection may be changed in an oscillating fashion. Further, a reductant injection may be determined as a function of various operating conditions, such as the predetermined engine bounds as described in step 502.

Continuing to step 512, it may be determined if a change in temperature may be determined in response to the adjustment described in step 510. In some embodiments, a change in temperature may be determined as a function of various operating conditions, such as the predetermined engine bounds as described in step 502. Further, under some conditions, such as oscillating reductant injection as described in step 510, for example, the change in temperature may be integrated to output a signal such that the signal may exhibit increase reliability. Under some a change in temperature may not be determined. For example, the reductant injector may be clogged. Under various other conditions, a change in temperature may be determined. For example, an increase in an amount of urea injected to the exhaust system may result in a temperature drop as detected by temperature sensor 218.

If the temperature sensor may not detect a reduction in temperature upstream the reductant injection nozzle, then method 500 continues to step 514 whereat the injection system may be identified as root cause for degraded performance of the emission control system. Next, at step 522, method 500 may send a signal to indicate root cause. In some embodiments, an output signal indicating root cause of the emission control system may be sent to the controller. Consequently, the controller may illuminate an indicator light on the dashboard of the vehicle, for example. In another example, a diagnostic code may be stored such that root cause may be determined at a service bay. In yet another example, the controller may enable various other emission control strategies, as described herein. Further, the controller may limit various engine operating conditions, such as limiting engine operation to a number of cycles, until root cause may be rectified.

Referring back to step 512, if the temperature sensor may detect a reduction in temperature, then method 500 continues to step 516. At step 516, it may be determined if an ammonia concentration may be greater than a predetermined ammonia concentration at the outlet of the SCR catalyst. Under some conditions, an ammonia concentration may be greater than a predetermined or expected ammonia concentration. For example, the SCR catalyst may be damaged. However, under various other conditions, an ammonia concentration may substantially equivalent to a predetermined or expected ammonia concentration.

If an ammonia concentration at the outlet of the SCR catalyst may be greater than a predetermined ammonia concentration, then method 500 continues to step 518 whereat the SCR may be identified as root cause for degraded performance of the emission control system. Next, at step 522, method 500 may send a signal to indicate root cause, as described above.

Referring back to step 516, if an ammonia concentration at the outlet of the SCR catalyst may be substantially equivalent to a predetermined or expected ammonia concentration, then method 500 continues to step 520. At step 520, root cause may be identified by various conditions. In particular, if it may not be determined that root cause may be the injector system nor the SCR catalyst, than root cause may be various other conditions. Specifically, a change in reductant injection may result in a temperature change as indicated at step 512 (i.e. root cause may not be the injection system) and may result in an acceptable ammonia concentration at the outlet of the SCR catalyst (i.e. root cause may not be the SCR catalyst). However, the emission control system may exhibit degraded performance as determined by NOx sensor 220, for example. In one example, root cause may be degraded urea quality. In another example, root cause may be a degraded injection system.

At step 516, it may be determined if an ammonia concentration may be greater than a predetermined ammonia concentration at the outlet of the SCR catalyst. Under some conditions, an ammonia concentration may be greater than a predetermined or expected ammonia concentration. For example, the SCR catalyst may be damaged. However, under various other conditions, an ammonia concentration may substantially similar to a predetermined or expected ammonia concentration.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method of diagnosing an emission control system of an internal combustion engine including a selective catalyst reduction catalyst and a reductant injection system configured to inject reductant to the emission control system, the method comprising:
   during degraded performance of the emission control system, dynamically identifying a relationship between a plurality of operating conditions of the emission control system;
   correlating the relationship to a plurality of potential sources of degraded performance of the emission control system to identify at least one degraded source among said plurality of potential sources, said plurality of sources including the reductant injection system, the selective catalytic reduction catalyst, and a reductant quality; and
   indicating which of said plurality of sources was identified as degraded.

2. The method of claim 1 further comprising injecting reductant to the emission control system, wherein said identifying the relationship further comprises identifying a first relationship between a temperature condition detected downstream of injected reductant and a nitrogen oxide concentration condition, and where the identification of at least one degraded source includes indicating whether the injection system is the degraded source based on said first relationship.

3. The method of claim 1, wherein said identifying the relationship further comprises identifying a second relationship between an ammonia concentration condition detected downstream of the selective catalytic reduction catalyst and a nitrogen oxide concentration condition, and wherein the identification of at least one degraded source includes indicating whether the selective catalytic reduction catalyst is the degraded source based on said second relationship.

4. The method of claim 3, wherein said identifying the relationship further comprises identifying a third relationship between a temperature condition detected downstream of reductant injection, an ammonia concentration condition detected downstream of the selective catalytic reduction catalyst, and a nitrogen oxide concentration condition, and wherein the identification of at least one degraded source includes indicating whether the reductant is the degraded source based on said third relationship.

5. A method of operating an internal combustion engine having an emission control system including a reductant injection system configured to inject reductant to the emission control system, the emission control system further including a selective catalyst reduction catalyst, the method comprising:
   determining degraded performance of the emission control system;
   sequentially diagnosing a plurality of potential sources of degraded performance where a different combination of detected operating conditions is determined for each of said plurality of potential sources, the sequential diagnoses including sequentially diagnosing the injection system, the selective catalytic reduction catalyst, and a reductant quality; and
   distinguishing at least one degraded source from said plurality of potential sources based on said combination of detected operating conditions corresponding to said distinguished source.

6. The method of claim 5, further comprising enabling urea quality sensing before said determining degraded performance where said urea quality sensing is enabled when the engine is operating within predetermined bounds.

7. The method of claim 5, further comprising, during steady-state engine operation conditions, adjusting an reductant injection prior to sequentially diagnosing the plurality of potential sources.

8. The method of claim 5, wherein said sequentially diagnosing the plurality of potential sources comprises diagnosing the injection system based on a combination of a temperature condition and a nitrogen oxide concentration.

9. The method of claim 8, wherein said degraded source comprises the injection system when the temperature condition is not a reduced temperature and the nitrogen oxide concentration condition is a nitrogen oxide concentration greater than or equal to a threshold nitrogen oxide concentration.

10. The method of claim 5, wherein said sequentially diagnosing the plurality of potential sources comprises diagnosing the selective catalytic reduction catalyst whereby a combination of an ammonia concentration condition and a nitrogen oxide condition is determined.

11. The method of claim 10, wherein said degraded source comprises the selective catalytic reduction catalyst when the ammonia concentration condition is an ammonia concentration greater than or equal to a threshold ammonia concentration and the nitrogen oxide condition is a nitrogen oxide concentration greater than or equal to a threshold nitrogen concentration.

12. The method of claim 5, wherein said sequentially diagnosing the plurality of potential sources comprises diagnosing the reductant quality whereby a combination of a temperature condition, an ammonia concentration condition, and a nitrogen oxide condition is determined.

13. The method of claim 12, wherein said degraded source comprises the reductant quality, and wherein the temperature condition is a reduced temperature, the ammonia concentration condition is an ammonia concentration less than a threshold ammonia concentration, and the nitrogen oxide concentration is a nitrogen oxide concentration less than a threshold nitrogen oxide concentration.

14. An apparatus, comprising:
an internal combustion engine;
an emission control device including a catalyst for controlling emissions from the engine;
an injection system comprising an injector configured to selectively supply a reductant to the emission control device;
a nitrogen oxide sensor disposed downstream an emission control device;
an ammonia sensor disposed downstream the emission control device;
a temperature sensor fluidically disposed between the injector and the emission control device;
a controller comprising memory and a processor, the memory comprising instructions executable by the processor to:
determine a degraded performance of the emission control system;
dynamically identify a relationship based on feedback from the nitrogen oxide sensor and at least one of the ammonia sensor and the temperature sensor; and
correlate the relationship to a plurality of potential sources of degraded performance to identify at least one degraded sources among said plurality of potential sources.

15. The apparatus of claim 14, wherein the memory further comprising instructions executable by the processor to send a signal corresponding to the degraded source.

16. The apparatus of claim 15, wherein the memory further comprising instructions executable by the processor to prompt an indicator light to illuminate based on said signal.

17. The apparatus of claim 15, wherein the memory further comprising instructions executable by the processor to adjust at least one of an exhaust gas recirculation loop and an ignition timing based on said signal.

* * * * *